INVENTORS
MAX BERCHTOLD
HANS PETER LENZ
BY
Michael J. Striker
ATTORNEY

United States Patent Office
3,403,664
Patented Oct. 1, 1968

3,403,664
FUEL INJECTION SYSTEM
Max Berchtold, Kuesnacht, and Hans Peter Lenz, Zurich, Switzerland, assignors to Motor-Patent AG., Zug, Switzerland
Filed July 12, 1966, Ser. No. 564,629
Claims priority, application Switzerland, July 14, 1965, 9,862/65
25 Claims. (Cl. 123—139)

ABSTRACT OF THE DISCLOSURE

A fuel injection system in which a stream of fuel, circulated by a pump through a supply conduit and a return conduit, is intermittently braked by a first valve arranged at the junction of the supply conduit and the return conduit and intermittently moved between an open inactive position and a braking position to thus create a pressure wave in the supply conduit, and in which a check valve arranged adjacent the first valve in a fuel line connected at one end downstream of the junction to the supply conduit opens during creation of the pressure wave to permit the latter to pass through the fuel line and cause injection of fuel through an injection nozzle at the other end thereof, whereby the arrangement of the check valve prevents a pressure wave reflected at the injection nozzle to pass into the system.

---

The present invention relates to improvements in fuel injection systems for internal combustion engines. More particularly, the invention relates to improvements in fuel injection systems of the type wherein a pump causes a stream of fuel to circulate in a predetermined path and wherein the pressure of the fuel stream rises intermittently with simultaneous discharge of a column of fuel through an injection nozzle.

A serious drawback of fuel injection systems whose operation is based on the above outlined principle is that the column of fuel which is expelled through the injection nozzle often develops cavities or voids which reduce the amount of injected fuel and prevent accurate metering. Also, the development of pressures in such conventional fuel injection systems is not satisfactory because pressure surges in the fuel line or lines which contain the nozzles are not in satisfactory relationship with pressure surges in the conduitry which supplies fuel to such fuel lines.

Accordingly, it is an important object of the present invention to provide a novel and improved fuel injection system wherein the fuel columns which are discharged through the injection nozzle cannot develop voids and wherein the fuel pressures in all components of the system are controlled in such a way that the injection nozzle invariably receives accurately metered quantities of fuel.

Another object of the invention is to provide an improved system of valves which may be utilized in the just outlined fuel injection system.

A further object of the invention is to provide a fuel injection system wherein the length of various conduits, pipes, lines and other components is selected by full consideration of all such factors which could influence the operation of the fuel injection system.

A concomitant object of the invention is to provide a fuel injection system whose components may be assembled into a compact unit, which can be utilized in connection with internal combustion engines for automotive vehicles as well as in connection with stationary internal combustion engines, and which comprises a relatively small number of simple, rugged and reliable components.

Still another object of the invention is to provide a fuel injection system which can be combined with presently known internal combustion engines without necessitating any alterations in the construction and/or operation of such engines.

Briefly stated, one feature of our invention resides in the provision of a fuel injection system which comprises a fuel tank or another suitable source of fuel, pump means (preferably a low-pressure variable-delivery pump) for drawing fuel from the source, a supply conduit having an intake end connected with the pump means to receive a continuous stream of fuel, a fuel line having an inlet connected with the discharge end of the supply conduit, a return conduit (which may discharge into the source) having an inlet connected to the discharge end of the supply conduit to normally receive the fuel stream from the supply conduit, first valve means provided in one of the conduits for intermittently throttling the flow of fuel from the discharge end of the supply conduit into the inlet of the return conduit so that the pressure of fuel in the supply conduit rises, and second valve means provided in the inlet of the fuel line and arranged to open when the pressure of fuel in the supply conduit rises so that the fuel line receives a column of fuel from the supply conduit.

The two valve means are preferably immediately adjacent to each other and their component parts may form an integral unit which can be accommodated in a common housing. The fuel injection system further comprises a bypass conduit or analogous means for permitting permanent circulation of a portion of the fuel stream, i.e., some fuel is preferably allowed to flow from the supply conduit into the return conduit even at such times when the first valve means is moved to a fully closed position.

The novel features which are considered as characteristic of the invention are set forth in particular in the appended claims. The improved fuel injection system itself, however, both as to its construction and its mode of operation, together with additional features and advantages thereof, will be best understood upon perusal of the following detailed description of certain specific embodiments with reference to the accompanying drawings, in which:

Figure 1:
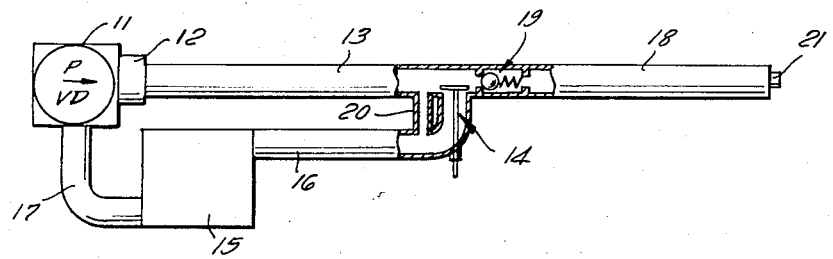
FIG. 1 is a diagrammatic partly elevational and partly sectional view of a fuel injection system which embodies one form of our invention.

Referring to the drawings in detail, and first to FIG. 1, there is shown a fuel injection system for use in connection with single-cylinder or multiple-cylinder internal combustion engines. This fuel injection system comprises a source of fuel, e.g., a fuel tank 15 which is connected with a suction pipe 17 leading to the intake of a low-pressure variable-delivery fuel pump 11. The outlet of this pump is connected with the intake end of a supply conduit 13 whose discharge end is connected with the inlet of a fuel line 18 and with the inlet of a return conduit 16 serving to return fuel into the tank 15. The supply conduit 13 comprises a reflection chamber 12 which constitutes its intake end and receives fuel from the outlet of the pump 11.

The fuel injection system further comprises a first valve 14, here shown as a simple poppet valve which is disposed in the conduit 13 or 16 at the discharge end of the conduit 13 and serves as a means for intermittently throttling the flow of a fuel stream from the supply conduit 13 into the return condit 16. A second valve, here shown as a simple ball check valve 19, is provided in the inlet of the fuel line 19 and its spring is strong enough to prevent admission of fuel into the fuel line 18 when the valve member of the poppet valve 14 is open.

In accordance with another highly advantageous feature of our invention, the fuel injection system further comprises a bypass conduit 20 which is connected with the supply conduit 13 upstream of the valve 14 and with the return conduit 16 downstream of this valve. The cross-sectional area of the bypass conduit 20 is relatively small so that a small portion of the fuel stream which is circulated by the pump 11 is free to flow at all times from the supply conduit 13 into the return conduit 16 regardless of the momentary position of the valve member in the valve 14.

The fuel line 18 contains a fuel injection nozzle 21 which is spaced from the check valve 19 by a distance which preferably equals or approximates the length of the supply conduit 13.

Figure 2:
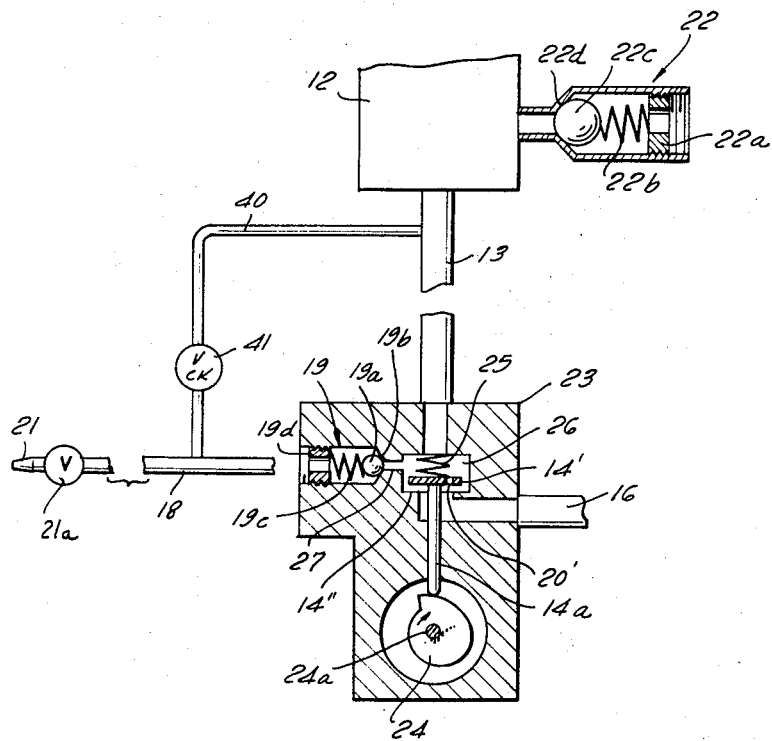
FIG. 2 is an enlarged fragmentary sectional view of a modified fuel injection system wherein the valve which throttles the flow of fuel from the supply conduit to the return conduit simultaneously provides a path for continuous flow of some fuel to the return conduit.

As shown in FIG. 2, the fuel injection system also comprises a control unit which regulates the characteristics of the fuel stream which flows through the supply conduit 13, thereupon through the valve 14 and bypass conduit 20, return conduit 16, fuel tank 15, suction pipe 17, and back into the pump 15. This control unit may comprise an adjustable pressure relief valve 22 which is connected with the reflection chamber 12 and can discharge fuel back into the tank 15 or into another receptacle. The valve 22 insures that the pressure of fuel in the supply conduit 13 equals a preselected pressure.

The operation of the fuel injection system which is shown in FIG. 1 is as follows:

In normal operation, the pump 15 delivers a continuous stream of fuel which flows through the reflection chamber 12 and thereupon through the remainder of the supply conduit 13 to pass through the valve 14 (whose valve member is in open position) and through the bypass conduit 20, through the return line 16, and back into the tank 15. At certain intervals, whose timing may be determined automatically, for example, at intervals determined by a drive which moves the valve member of the valve 14 to closed or full throttling position as a function of variations in fuel pressure in the supply conduit 13, this valve member will assume its throttling position in which it can completely seal the valve 14 whereby the pressure of fuel in the supply conduit 13 builds up and the check valve 19 opens automatically to admit a column of fuel into the fuel line 18. Alternatively, the drive which opens and closes the valve 14 may operate independently of the variations of fuel pressure in the supply conduit 13. This will be described later in connection with FIGS. 2 and 4 to 6.

When the valve 14 is to throttle the flow of fuel into the return conduit 16, its valve member moves rapidly to closing or sealing position so that the major portion of the fuel stream is prevented from circulating in the aforedescribed path, i.e., only a small portion of fuel which is conveyed through the bypass conduit 20 is allowed to enter the return conduit 16. The resulting surge in pressure of fuel in the supply conduit 13 automatically opens the check valve 19 for a short interval of time so that the pressure surge propagates itself along the fuel line 18 and an accurately determined amount of fuel is caused to pass through the orifice or orifices of the nozzle 21 to be admitted into the intake manifold or directly into a cylinder of the internal combustion engine. The valve 14 then opens again and the entire fuel stream is again free to flow from the supply conduit 13 into the return conduit 16. The pressure generated by the fuel pump 15 is less than the pressure required for opening of the check valve 19, i.e., the valve 19 opens only when the fuel pressure in the supply conduit 13 rises in response to partial or full closing of the valve 14.

Figure 3:
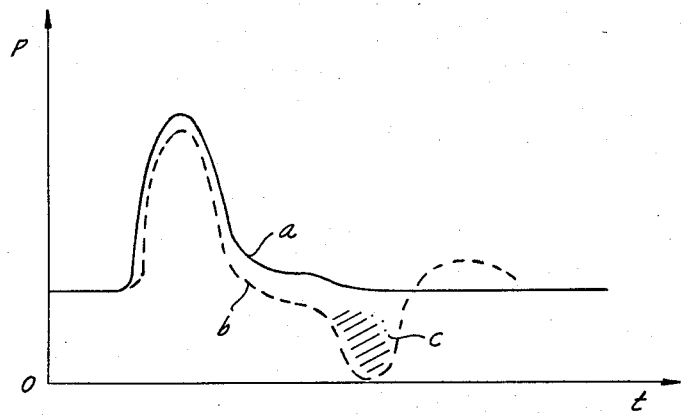
FIG. 3 is a diagram showing by solid lines a first curve which indicates variations in fuel pressure which develop in the fuel injection system of our invention and by broken lines a second curve which indicates variations in fuel pressure in a conventional fuel injection system.

A very important advantage of our fuel injection system over conventional fuel injection systems is that the check valve 19 is immediately or closely adjacent to the valve 14. In such conventional systems, the check valve is located at the discharge end of the fuel line. The advantages of our system will be more readily understood by referring to the diagram of FIG. 3 wherein the curve $a$ shows the pressures which develop in our fuel injection system and the curve $b$ shows pressures developing in a conventional system wherein the valve corresponding to our valve 19 is remote from the valve 14. It will be seen that the pressure P increases with time $t$ when the valve 14 closes. When the valve 19 opens, the curve $a$ flattens out so that the pressure of fuel column which is free to escape through the fuel line 18 remains substantially constant. In a conventional fuel injection system (curve $b$) wherein the valve 19 is remote from the valve 14, the pressure P builds up substantially in the same way as in the system of FIG. 1, but such pressure drops suddenly when the remote valve 19 opens (this is indicated by the hatched area $c$ shown in FIG. 3) and is not constant so that the delivery of fuel by the nozzle is not uniform and the column in the fuel line can develop cavities or voids which are highly undesirable because they affect the uniformity of injection into the manifold or into a cylinder and prevent accurate metering of injected fuel.

A very important advantage of our fuel injection system is that it does not develop subatmospheric pressures and that the pressures therein are always above vapor pressure of the fuel. The cross-sectional area of the passage for fuel in the nozzle 21 can be readily selected in such a way that the reflection of pressure waves in the fuel line 18 is always positive. The bypass conduit 20 insures that the pressure surge develops in a zone (conduit 13) wherein the fuel actually flows so that reflection at the chamber 12 cannot cause any pronounced drop in pressure. The provision of the bypass conduit 20 (or an equivalent means for permitting some fuel to circulate when the valve 14 is closed) and the positioning of the valve 19 in the inlet of the fuel line 18 are believed to be the two important factors which contribute to superior operation of our fuel injection system. The length of the conduit 13, the length of the fuel line 18 and the ratio of such lengths are also important, as well as the timing of intervals during which the valve 14 throttles or prevents direct flow of fuel therethrough. The length of the supply conduit 13 will be a factor in determining the exact length of intervals (dwell) when the valve 14 throttles the flow of fuel. The dwell of the valve 14 in closed position should be shorter or at most equals the time $t_w$ required by a wave to travel along the supply conduit 13. This can be expressed by the equation $t_w = 2L/a$ wherein L is the length of the supply conduit 13 and $a$ is the speed of sound in the conduit 13. If the dwell is longer than $t_w$, the desired optimum pressure surge is weakened by pressure waves which travel in the supply conduit 13 back toward the pump 11 so that the system will not take maximum advantage of the kinetic energy of the travelling fuel column.

The length of the fuel line 18 determines the length of the intervals during which the fuel is actually injected, and such intervals will be selected in dependency on certain characteristics of the internal combustion engine in which the fuel injection system is being put to use.

The ratio between the length of the supply conduit 13 and the length of the fuel line 18 is important for the following reason: If the fuel line 18 is considerably longer than the supply conduit, the pressure impulses continue to travel back and forth in the fuel line at the time when the flow conditions in the supply conduit again return to normal. This reduces the maximum possible injection frequency and the kinetic energy of the fuel column is not utilized with requisite efficiency. The ratio of the length of the conduit 13 to the length of the fuel line 18 is preferably one-to-one.

It was found that the improved fuel injection system can be used with advantage in the internal combustion engines of automotive vehicles as well as in many other types of internal combustion engines. The provision of the two closely adjacent valves 14, 19 and the provision of the bypass conduit 20 will insure satisfactory operation within a very wide pressure range.

Referring again to FIG. 2, it will be seen that the valves 14a and 19 are accommodated in a common housing 23 which is further connected with the discharge end of the supply conduit 13, with the inlet of the return conduit 16, and with the inlet of the fuel line 18. The check valve 19 comprises a ball 19a which is biased against an annular seat 19b of the housing 23 by a helical spring 19c whose bias can be adjusted in response to rotation of a threaded plug 19d. The valve 14a comprises a valve member 14′ which is reciprocable in an internal compartment 26 of the housing 23 and is biased by a helical spring 25 so that it can seal an annular seat 14″. The stem 14a of the valve member 14′ is reciprocable by a drive including a camshaft 24a for a cam 24. When the tip of the stem 14a tracks the lobe of the cam 24, the valve member 14′ is lifted off the seat 14″ and the fuel is free to flow from the supply conduit 13 into the return conduit 16. When the lobe bypasses the stem 14a, the spring 25 expands and moves the valve member 14′ against the seat 14″ so that the fuel stream in the supply conduit 13 is pressurized and the valve 19 opens in response to a predetermined pressure. The camshaft 24a is driven independently of the condition of the fuel stream in the conduit 13.

The aforementioned control or check valve 22 is adjustable by means of an externally threaded annular plug 22a which can change the bias of a spring 22b urging the ball 22c against its seat 22d.

The system of FIG. 2 does not have a bypass conduit (such as the conduit 20 of FIG. 1) because the valve member 14′ is provided with one or more relatively small apertures 20′ which allow at all times a portion of the fuel stream to flow from the supply conduit 13 into the return conduit 16, i.e., the aperture or apertures 20′ will admit fuel into the conduit 16 even if the valve member 14′ bears against the seat 14″.

The nozzle 21 at the free end of the fuel line 18 may be provided with a further valve, for example, with a suitable needle valve 21a. The cross-sectional area of the nozzle 21 is relatively small, for example, the ratio of the cross-sectional area of this nozzle to the cross-sectional area of the supply conduit 13 may be 1:100. This will insure that all pressure surges reflected in the nozzle 21 are positive.

Figure 4:
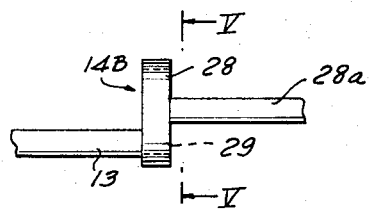
FIG. 4 is a side elevational view of a valve member which may be utilized in a modified fuel injection system.
Figure 5:
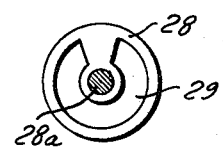
FIG. 5 is a section as seen in the direction of arrows from the line V—V of FIG. 4.

FIGS. 4 and 5 illustrate a portion of a modified valve 14B which can replace the valve 14 or 14A. This valve 14B comprises a rotary valve member 28 having a drive shaft 28a and provided with at least one aperture or through slot 29 which registers with the discharge end of the supply conduit 13 during each revolution of the shaft 28a and then allows fuel to flow from the supply conduit 13 into the return conduit 16 (not shown). The pressure of the fuel stream in the conduit 13 will rise when the aperture 29 is moved away from registry with the discharge end.

Figure 6:
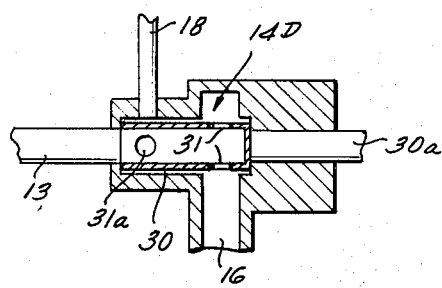
FIG. 6 is a section through the housing of a twin valve which can control the flow of fuel from the supply conduit to the return conduit and also to the fuel line.

FIG. 6 shows a further valve 14D which can be used as a substitute for the check valve 19 and for the valve 14, 14A or 14B. In other words, the structure shown in FIG. 6 comprises a twin valve which can regulate the flow of fuel from the supply conduit 13 to the return conduit 16 and also to the fuel line 18. The valve member 30 of this valve resembles a hollow cylinder which is rotated by a drive shaft 30a. The open axial end of the valve member 30 is in permanent registry with the discharge end of the supply conduit 13 so that the interior of the valve member is filled with fuel. Such fuel can flow into the return conduit 16 when the latter's inlet registers with a radial aperture 31 of the valve member 30. As shown in FIG. 6, the valve member 30 may be formed with two or more apertures 31 each of which registers with the return conduit 16 during a portion of each revolution of the drive shaft 30a.

The valve member 30 is provided with one or more additional apertures or orifices 31a which will register with the inlet of the fuel line 18 when the apertures 31 are out of registry with the return conduit 16, i.e., when the latter receives no fuel or only a small amount of fuel which can flow through a suitable bypass conduit (not shown) or leaks around the valve member 30.

It is clear that the valve 14, 14A, 14B or 14D may be operated by an electromagnetic, hydraulic or pneumatic drive without departing from the spirit of our invention. Also, and as shown in FIG. 6, the drive (shaft 30a) for the valve 14D may be of such construction that the fuel line 18 receives a column of fuel automatically, not in response to a buildup in in pressure of fuel in the supply conduit 13 but with a predetermined delay following partial sealing of the supply conduit 13 from the return conduit 16. In other words, the admission of fuel into the fuel line 18 can take place as a function of rise in fuel pressure or as a function of the position of the valve member or valve member portion which regulates the flow of fuel between the conduits 13 and 16.

The numeral 40 denotes in FIG. 2 a pipe which connects the supply conduit 13 directly with the fuel line 18. This pipe contains a check valve 41 which is opened only when the internal combustion engine is started so that all of the fuel which is needed for starting of the engine can be admitted in a path not including the valves 14A and 19.

If the improved fuel injection system is utilized in connection with a multicylinder internal combustion engine each cylinder of which receives fuel directly from a nozzle 21 at the discharge end of a fuel line 18, all of the valves 14, 19 or 14A, 19 or 14B, 19 or 14D may be accommodated in a common valve housing. The various valves may be arranged in the common housing in one or more rows but they may also form a star-shaped assembly, a letter V, or may be arrayed in any other suitable way to occupy little room. In such fuel injection systems, a single cam (corresponding, for example, to the cam 24 shown in FIG. 2) can operate the valve members of two or more valves 14 or 14A.

It is also possible to mount the cam 24 of FIG. 2 on the shaft which drives the pump 11. This pump may be accommodated in a casing or housing which further accommodates the control means (such as the valve 22 shown in FIG. 2) and the housing 23 for the valves 14A, 19.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a fuel injection system, in combination, a source of fuel; pump means having a suction end connected to said source of fuel and a discharge; a supply conduit having an intake end connected to said discharge of said pump means and a discharge end spaced from said intake end; a return conduit having one end connected to said discharge end of said supply conduit and another end communicating with said fuel supply so that fuel pumped by said pump means may flow in a stream through said supply conduit and said return conduit back to said fuel supply and said pump means; first valve means at the junction of said return conduit and said supply conduit and intermittently movable between an open inactive position and a throttling position and causing when in said throttling position an increase of pressure in said supply conduit; a fuel line connected at one end with said discharge end of said supply conduit; an injection nozzle at the other end of said fuel line; and second valve means in said fuel line adjacent said first valve means and arranged to open when the pressure in said supply conduit is increased so that the pressure wave created in said supply conduit during movement of said first valve means to said throttling position will pass through said fuel line and cause discharge of fuel through said nozzle at the other end of said fuel line, whereby the arrangement of said second valve means will prevent a pressure wave reflected at said nozzle to pass back into said supply conduit.

2. A structure as set forth in claim 1, wherein said first valve means comprises a valve seat provided at said junction and a valve member movable into sealing engagement with said seat to thereby reduce the flow of fuel from said supply conduit into said return conduit, said valve member having at least one aperture which permits passage of fuel so that a portion of said stream is free to flow from said supply conduit into said return conduit when said valve member engages said seat.

3. A structure as set forth in claim 1, further comprising a bypass conduit connected with said supply conduit upstream of said first valve means and with said return conduit downstream of said first valve means to continuously convey a portion of said stream so that some fuel can flow at all times from said supply conduit to said return conduit.

4. A structure as set forth in claim 3, wherein said first valve means comprises a valve member which is movable between an open position and a sealing position in which only said bypass conduit conveys fuel from said supply conduit to said return conduit.

5. A structure as set forth in claim 1, wherein said second valve means comprises a check valve arranged to open automatically in response to a predetermined pressure of fuel in said supply conduit when said first valve means throttles the flow of fuel to said return conduit.

6. A structure as set forth in claim 5, wherein said pump means is arranged to deliver fuel to said supply conduit at a second predetermined pressure which is less than said first-mentioned predetermined pressure.

7. A structure as set forth in claim 1, further comprising a common housing for said first and second valve means, said housing being connected with the discharge end of said supply conduit, with the inlet of said fuel line and with the inlet of said return conduit.

8. A structure as set forth in claim 1, wherein said first valve means comprises a valve member movable between throttling and open positions and further comprising drive means for moving said valve member between such positions independently of the conditions of fuel flow in said supply conduit.

9. A structure as set forth in claim 1, wherein said first valve means comprises a valve member movable between throttling and open positions and further comprising drive means for moving said valve member between such positions in response to variations in fuel pressure in said supply conduit.

10. A structure as set forth in claim 1, wherein said fuel injection nozzle is spaced from said second valve means by a distance at least approximating the length of said supply conduit.

11. A structure as set forth in claim 1, wherein siad first valve means comprises a poppet valve.

12. A structure as set forth in claim 1, wherein said first and second valve means form an integral unit.

13. A structure as set forth in claim 1, further comprising control means for regulating the speed of the fuel stream in said supply conduit.

14. A structure as set forth in claim 13, wherein said pump means comprises a variable delivery pump and said control means comprises means for regulating the delivery of said pump.

15. A structure as set forth in claim 13, wherein said control means comprises adjustable pressure relief valve means provided in said supply conduit.

16. A structure as set forth in claim 1, wherein said nozzle has a predetermined effective cross-sectional area for passage of fuel and such cross-sectional area being a small fraction of the cross-sectional area of said supply conduit.

17. A structure as set forth in claim 16, wherein the ratio of the cross-sectional area of said nozzle to the cross-sectional area of said supply conduit is about 100:1.

18. A structure as set forth in claim 16, wherein the ratio of the cross-sectional area of said nozzle to the cross-sectional area of said supply conduit is such that all pressure surges reflected at the nozzle are positive surges.

19. A structure as set forth in claim 1, wherein said supply conduit comprises a reflection chamber for fuel and further comprising control means for regulating the speed of the fuel stream in said supply conduit.

20. A structure as set forth in claim 1 for use in connection with an internal combustion engine, further comprising additional conduit means for delivering fuel from said supply conduit upstream of said first valve means to said fuel line downstream of said second valve means when the engine is being started.

21. A structure as set forth in claim 1 for use in connection with a multicylinder internal combustion engine, comprising additional fuel lines, additional first and second valve means and common housing means for all of said valve means.

22. A structure as set forth in claim 21, wherein each of said first valve means comprises a valve member movable between open and throttling positions and further comprising drive means for said valve members, said drive means comprising a drive member common to a plurality of said valve members.

23. A structure as set forth in claim 1, wherein said first valve means comprises a valve member movable between open and throttling positions and further comprising common drive means for said pump means and for said valve member.

24. A structure as set forth in claim 1, further comprising common housing means for said pump means and said valve means.

25. A structure as set forth in claim 1, wherein said first valve means is arranged to remain in throttling position for intervals which are shorter than times required for the propagation of a pressure wave along said supply conduit.

References Cited

UNITED STATES PATENTS

| | | | |
|---|---|---|---|
| 2,743,593 | 5/1956 | Bischoff | 123—139.13 |
| 2,852,014 | 9/1958 | Paschke et al. | 123—139 |

LAURENCE M. GOODRIDGE, *Primary Examiner.*